(12) United States Patent
Baldi

(10) Patent No.: US 12,121,005 B2
(45) Date of Patent: Oct. 22, 2024

(54) OMNIDIRECTIONAL DOORBELL SWITCH FOR PETS

(71) Applicant: Michael Owen Baldi, Walpole, MA (US)

(72) Inventor: Michael Owen Baldi, Walpole, MA (US)

( * ) Notice: Subject to any disclaimer, the term of this patent is extended or adjusted under 35 U.S.C. 154(b) by 77 days.

(21) Appl. No.: 18/053,460

(22) Filed: Nov. 8, 2022

(65) Prior Publication Data

US 2024/0147957 A1  May 9, 2024

(51) Int. Cl.
*G08B 1/08* (2006.01)
*A01K 1/035* (2006.01)
*G08B 3/10* (2006.01)

(52) U.S. Cl.
CPC ............... *A01K 1/035* (2013.01); *G08B 3/10* (2013.01)

(58) Field of Classification Search
USPC ......... 340/328, 566, 567, 561, 568.4, 572.8, 340/582, 613, 644, 683, 686.1, 687, 340/825.49
See application file for complete search history.

(56) References Cited

U.S. PATENT DOCUMENTS

| | | | |
|---|---|---|---|
| 9,888,371 B1* | 2/2018 | Jacob | G08B 25/08 |
| 2006/0126862 A1* | 6/2006 | Andrews | H04R 5/02 |
| | | | 381/77 |
| 2012/0312247 A1* | 12/2012 | Ebersole | A01K 15/02 |
| | | | 340/573.3 |
| 2015/0237828 A1* | 8/2015 | Peavey | A01K 15/025 |
| | | | 119/707 |
| 2018/0197383 A1* | 7/2018 | Tso | H03K 17/6871 |
| 2021/0342020 A1* | 11/2021 | Jorasch | H04L 63/0861 |

* cited by examiner

*Primary Examiner* — Daniel Previl

(57) ABSTRACT

A swipe-activated self-canceling omnidirectional contact switch mechanism that provides felines and canines of any size, height, mass, or intrinsic pawing capabilities, with the means to send an electronically generated signal to their respective caretakers by applying, from any external direction, a natural non-linear swiping action of an arcing forepaw to an electrified outer semi-rigid, flexible, and hollow electrical conductor which, by being forced to come into contact with an axially aligned electrified inner electrical conductor, closes a previously open statically energized electrical circuit of an interconnected ancillary alerting system which actions culminate with the broadcast of an audible and/or visual alert.

5 Claims, 13 Drawing Sheets

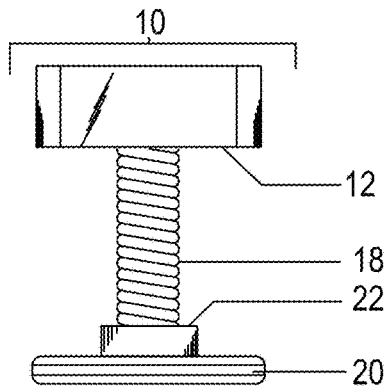
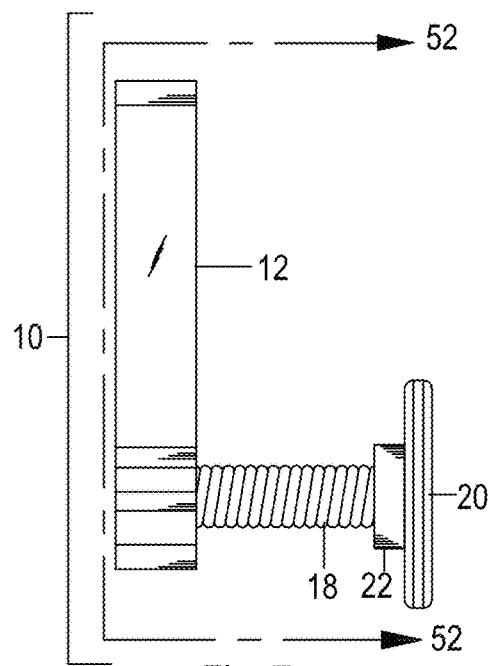
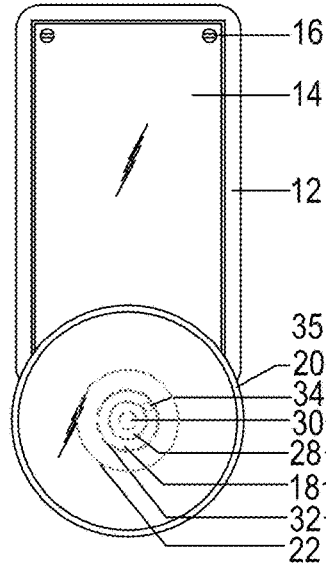
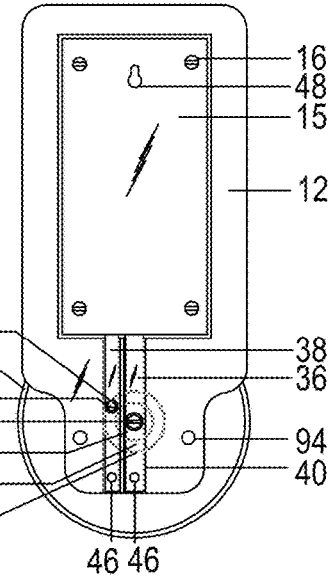
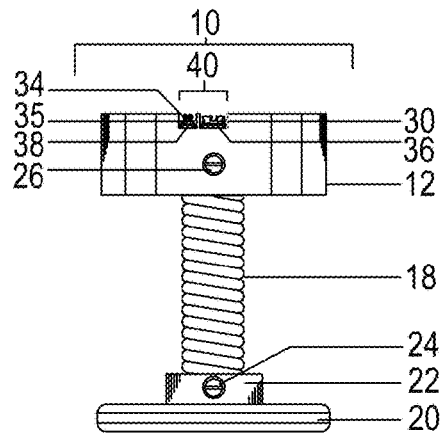

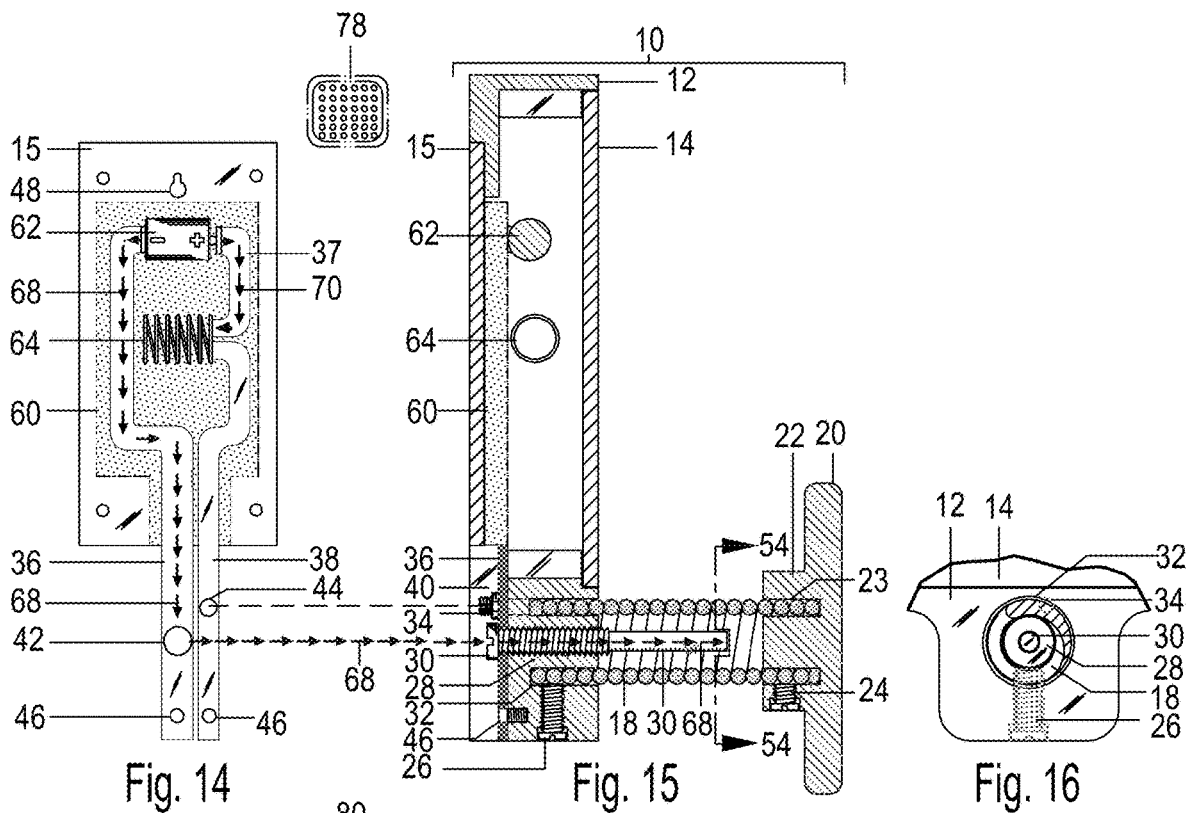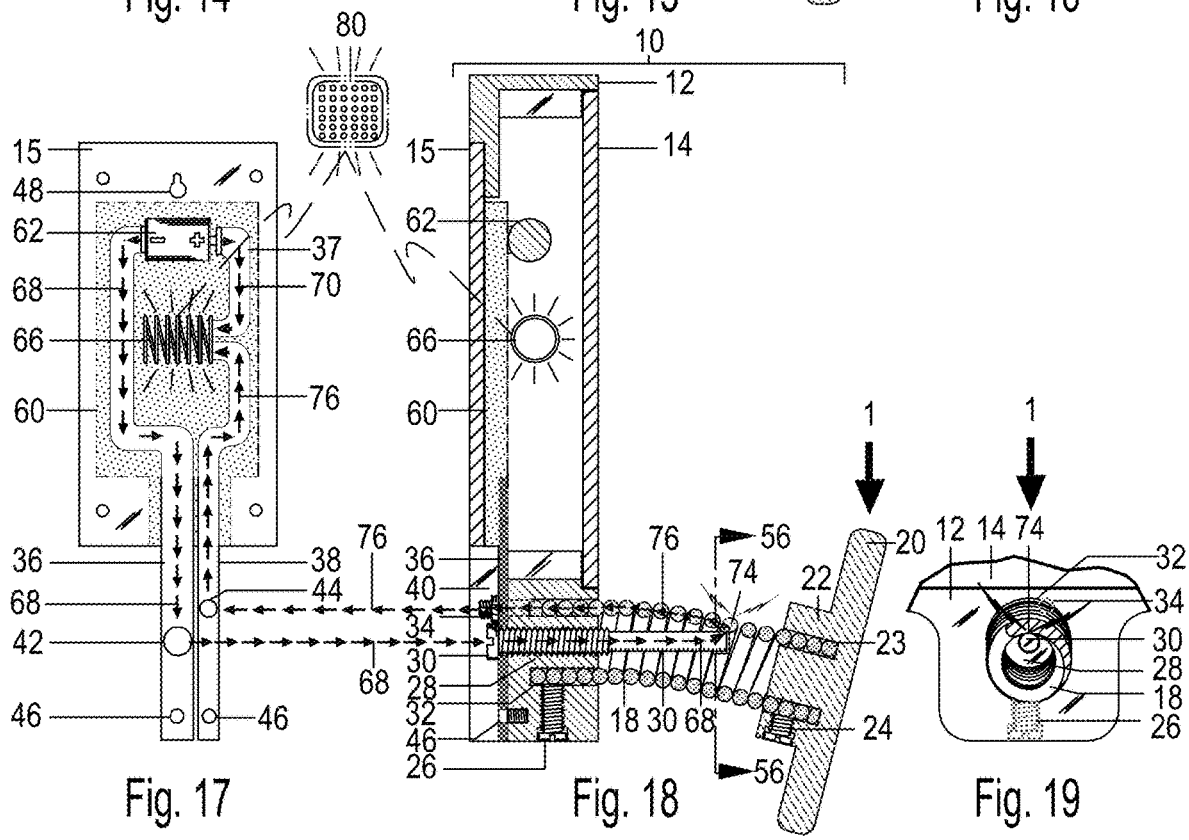

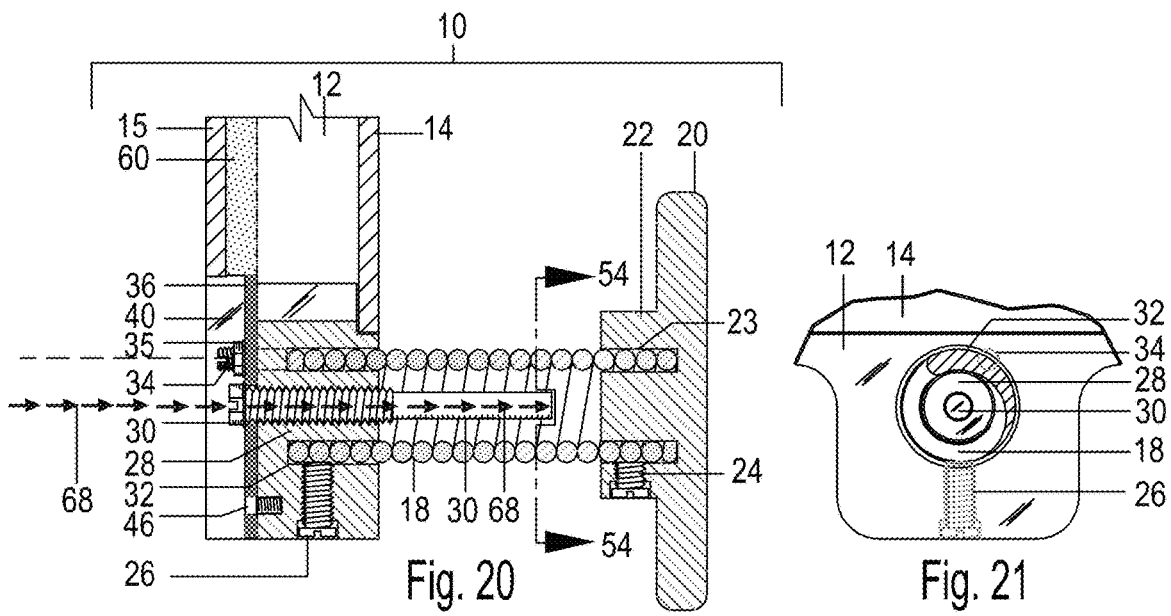
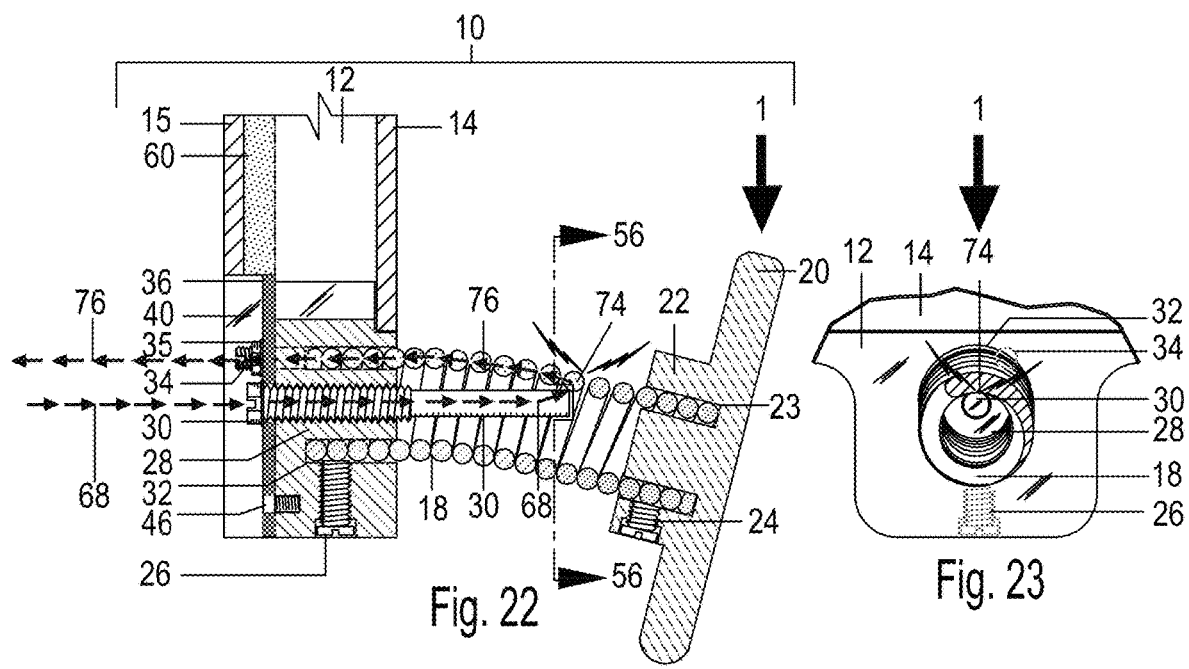
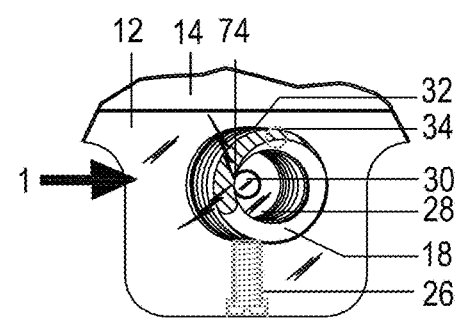

OMNIDIRECTIONAL DOORBELL SWITCH FOR PETS

FIELD OF THE INVENTION

A device to improve the manner in which dogs and cats, of any height or force of forepaw, can most naturally alert a caretaker of their desire to pass through a closed doorway.

BACKGROUND AND SUMMARY OF THE INVENTION

Because alerting devices currently marketed for pets ignore the naturally dominant non-lineal swiping actions common to the forepaw of both cats and dogs alike, but are instead patterned after the human ability to push a doorbell switch linearly inward, they characteristically impose several physical hardships on all classes and sizes of domestic pets. By ignoring the natural arcing motion of an animal's swiping forepaw these linear styled pet doorbells of the current art, which ultimately require a pet to push either linearly inward on a doorbell switch or to otherwise push simultaneously inward and downward on a levered switch to activate the same type of a linear styled doorbell switch embedded within, they collectively call for long term actions that are unnatural for an animal to perform, which are even more severely exacerbated when a pet is required to use only its nose to push in on what is inherently a very resistant type of focused doorbell switch.

These physically challenging hardships are further amplified in those commonly frequent instances when a caretaker is unable to immediately respond to a pets alert since an animal, who is a predominantly impatient by nature, especially when standing at a closed doorway, will continue in repeating their alerting efforts until a caretaker has responded to their beckoning signal. And in those cases where these same linear-styled devices are subjected to sub-freezing temperatures, these repetitive actions only serve to multiply yet again the unnatural stresses being imposed on the pets musculoskeletal anatomy and/or on the fragile tissues of their chapped noses and/or on their chapped paw pads, which also only serves to collectively imperil their long-term psyche as well.

And in those households having multiple pets that are of very different heights and sizes, and who are thus naturally possessed of a wider range of physical capabilities, the caretaker is required to install multiple linear-style devices of the current art to accommodate the height and thrusting capabilities relative to each pets paw and/or nose, but without any assurance that the pet will be able to successfully activate these height sensitive linear-styled focused doorbell switch devices with a consistently accurate and adequately applied linear force despite the pets many tiring and repeated attempts to do so.

But these imposed hardships are not isolated to just the larger or the more mature classes of canines, for which the vast majority of linear doorbell switches are marketed for, but they are further exacerbated for small breeds of dogs, puppies, and just as importantly, for the nearly forgotten realm of cats as well, whose height, body mass, and psychological readiness precludes them from executing a linearly accurate and forceful frontal assault on a characteristically resistant type of pet doorbell switch of the current art, most especially in light of their more delicate shorter noses, or their much gentler poking forepaws.

To remedy these shortcomings the present device;

Provides a pet doorbell which is easily activated from any random swiping direction while being typically set at a universally comfortable low forepaw height for all sizes and classes of pets. These are critical attributes which are achieved through the physical relationships provided to the device by a cantilevered moment-producing omnidirectional non-linear deflection switch design that intrinsically amplifies any slight force being applied to it from any swiping direction by pets of any size or force of forepaw. And as a further advantage of this design the sensitivity of this moment-producing mechanism can be easily modified, field adjusted, or otherwise counter-balanced simply by modifying the size, weight, and/or shape of the pawing target, or by modifying the resistive attributes of the conductive axial components of the switch mechanism.

And it is because all pets share a very natural, comfortable, non-lineal, low-bearing, and arcing forepaw, which is commonly characteristic to every animal's swiping instinct, it enables a single module of the present device to be typically installed at a universally low position to readily accommodate the aforementioned natural arc of a swiping forepaw. This too is a critical attribute of the present device since it completely eradicates the stresses that an impatient pet is currently required to self-inflict to their facial areas, noses, tissues, musculoskeletal anatomy, legs, paws, claws, and muscles when attempting to activate a linear styled pet doorbell switch on a long-term repetitive basis. In addition, it is because this device is typically installed at a universally low position, that it further eliminates the necessity of a caretaker to install, and subsequently periodically adjust height sensitive devices relative to the current art in order to accommodate a pets unique physical attributes, both initially and as the pet grows into maturity.

However, in those cases where pets of vastly different sizes do reside in the same household, or if their natural pawing capabilities are observed to fall more comfortably at different arcing levels, or if the caretaker desires to enhance the pawing target zone due to snow accumulations or the like, then a series of omnidirectional devices can be optionally dispersed, interconnected, and/or the pawing targets can be easily modified by various shape enhancements to best accommodate the most comfortable natural swiping heights for each pet, or to otherwise best meet the environmental and/or structural conditions to which the present device is to be mounted.

BRIEF DESCRIPTION OF THE DRAWINGS

FIG. 6 A front view of the present omnidirectional switch device in its assembled wireless form.

FIG. 7 A side view of the present omnidirectional switch device in its assembled wireless form.

FIG. 8 A rear view of the present omnidirectional switch device in its assembled wireless form.

FIG. 9 A top view of the present omnidirectional switch device in its assembled wireless form.

FIG. 10 A bottom view of the present omnidirectional switch device in its assembled wireless form.

FIG. 14 A front view depicting the electrical flow relative to a typical battery powered generic wireless signal circuit board when in an open circuit state.

FIG. 15 A sectional side view of the present omnidirectional switch device in a wireless form to illustrate the spatial relationship which axially exists between the outer flexible cantilevered electrical conductor and the inner cantilevered electrical conductor of the deflection switch mechanism when the energized electrical circuit is open relative to the electrical flow diagrammatic of FIG. 14.

FIG. 16 A front sectional view illustrating the concentric spatial relationships which axially exists between the cantilevered electrical conductors of the deflection switch mechanism of the present omnidirectional switch device when the circuit is open relative to and in accord with the electrical flow diagrammatic of FIG. 14 and FIG. 15.

FIG. 17 A front view depicting the electrical flow relative to a typical battery powered generic wireless signal circuit board when in a closed circuit state that results in the sounding of an alert.

FIG. 18 An sectional side view of the present omnidirectional device in a wireless form illustrating a typical electrical transference which occurs when a randomly applied external swiping force causes the outer flexible cantilevered electrical conductor to come into contact with the inner cantilevered electrical conductor of the deflection switch mechanism which results in the closing of the electrical circuit relative to and in accord with the electrical flow diagrammatic of FIG. 17 which interactions cause the sounding of an alert.

FIG. 19 A front sectional view illustrating both the spatial relationships and the manner in which a typical electrical transference occurs between the outer flexible cantilevered electrical conductor and the inner cantilevered electrical conductor of the deflection switch mechanism as the result of an external force being applied to the deflection switch mechanism which interactions result in the closing of the electrical circuit relative to and in accord with the electrical flow diagrammatic of FIG. 17 and FIG. 18.

FIG. 20 A magnified sectional side view relative to FIG. 15 to illustrate with greater clarity the spatial relationships which exists between the outer flexible cantilevered electrical conductor and the inner cantilevered electrical conductor of the deflection switch mechanism when the energized electrical circuit is open.

FIG. 21 A front sectional view illustrating the axial spatial relationships which exists between the outer flexible cantilevered electrical conductor and the inner cantilevered electrical conductor of the deflection switch mechanism when the energized circuit is open in accord with and relative to the electrical flow diagrammatic of FIG. 20.

FIG. 22 A magnified sectional side view of the present omnidirectional switch device relative to FIG. 18 to illustrate with greater clarity the spatial relationships which exists between the outer flexible cantilevered electrical conductor and the inner cantilevered electrical conductor of the deflection switch mechanism at the instant when the energized electrical circuit is closed due to the electrical transference which occurs when a randomly applied external swiping force causes the outer flexible cantilevered electrical conductor to come into contact with the inner cantilevered electrical conductor of the deflection switch mechanism which interactions result in the closing of the electrical circuit in accord with and relative to the electrical flow diagrammatic of FIG. 17.

FIG. 23 A front sectional view illustrating both the spatial relationships and the manner in which electrical transference occurs between the outer flexible cantilevered electrical conductor and the inner cantilevered electrical conductor of the deflection switch mechanism at the instant when the energized circuit is closed in accord and relative to the electrical flow diagrammatic of FIG. 22.

FIG. 24 A front sectional view illustrating the spatial relationships and the manner in which electrical transference occurs between the outer flexible cantilevered electrical conductor and the inner cantilevered electrical conductor of the deflection switch mechanism when an external swiping force is manually applied to the switch mechanism from any random direction to produce a closed circuit condition via electrical transference in the same like manner as illustrated by the electrical flow diagrammatic of FIG. 22.

REFERENCE NUMERALS

Figure 1:
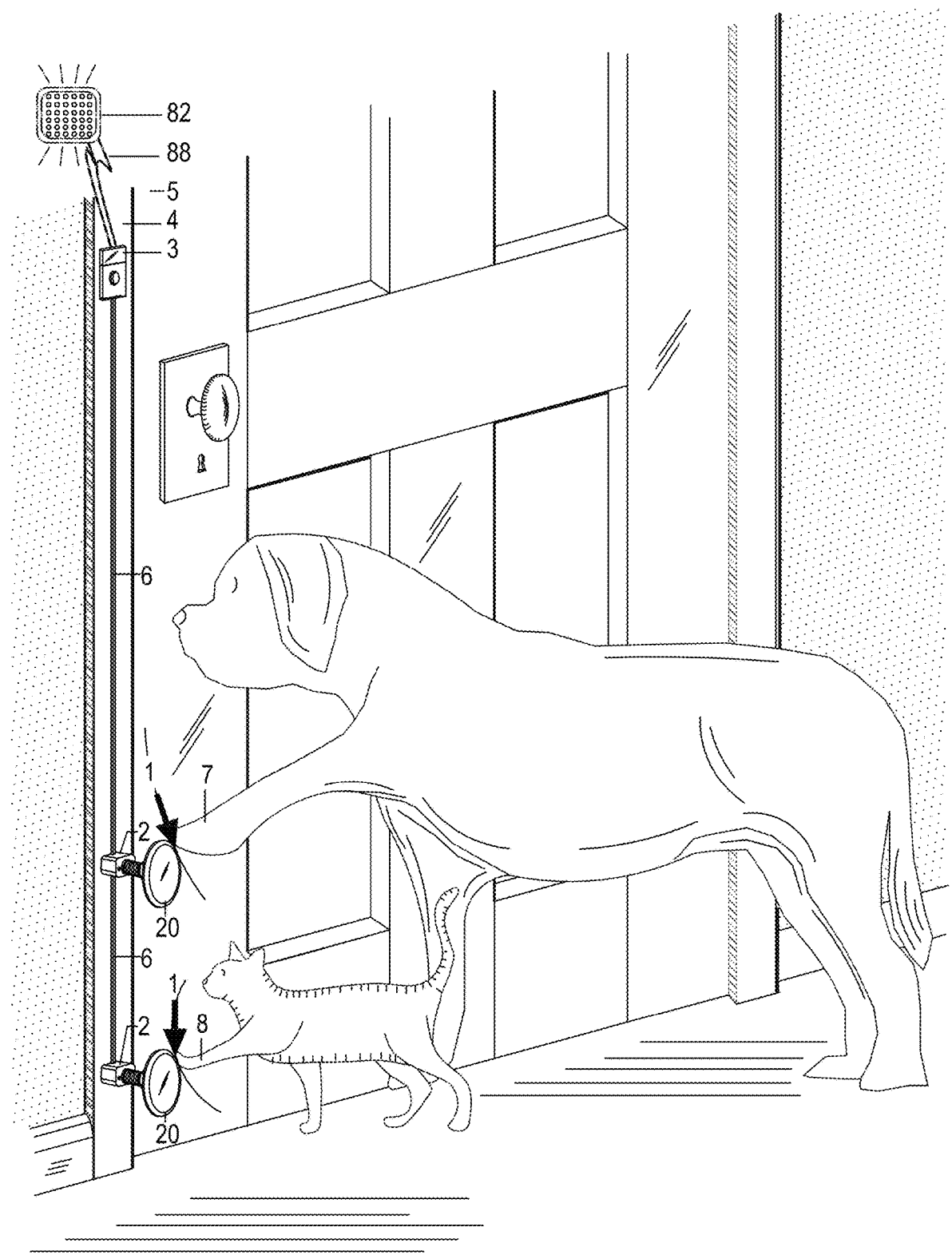
FIG. 1A contrasting perspective view depicting two interconnected modular forms of the present omnidirectional switch device affixed to a door jamb and externally hardwired to a conventional doorbell to illustrate the instant when each device is being independently swipe activated from two distinctly different random directions to accommodate the natural arcing forepaw actions common to both small and large size pets alike, each of whom is possessed of vastly different heights and forceful capabilities, but who are each enabled to easily activate the illustrated moment-producing electrical conductor signal sending omnidirectional deflection switch mechanism of the present device with equal and consistent success.

1 A randomly applied omnidirectional natural arcing force of a pets forepaw
2 An omnidirectional doorbell signaling device of the modular hard-wire type
3 A conventional hard-wired doorbell, video doorbell, or wireless doorbell unit
4 A typical door jamb
5 A typical entry/exit door
6 Conduit for shielding external hard-wire connections between doorbell signaling devices
7 A swiping forepaw of a large sized pet
8 A swiping forepaw of a small sized pet
9 A swiping forepaw of a medium sized pet
10 An omnidirectional doorbell signaling device of the self-contained wireless type
12 Housing for the self-contained wireless type of omnidirectional doorbell signaling device
13 Housing for the hard-wired modular type of omnidirectional doorbell signaling device
14 Maintenance cover (front)
15 Mounting plate/maintenance cover (rear)
16 Cover fastener (typical)
18 Electrical conductor spring (a primary component of the deflection switch mechanism)
19 Pawing target (spherical form)
20 Pawing target (generic form)
21 Pawing target (elongated form)
22 Pawing target attachment spool
23 Pawing target retention recess to receive the electrical conductor spring
24 Pawing target retention fastener
26 Electrical conductor spring retention fastener
28 Electrical insulator and alignment spool
30 Central axial electrical conductor (a primary component of the deflection switch mechanism)
32 Electrical conductor spring alignment and retention recess in the housing
34 Electrical conductor spring contact lug
35 Electrical conductor spring contact lug to electrical terminal cinching nut
36 Electrical conductor strip
37 Electrical conductor strip
38 Switch activated electrical conductor strip (negative polarity)
40 Electrical conductor separation and isolation channel
42 Aperture for receiving the central axial conductor
44 Aperture for receiving the conductor spring contact lug
46 Aperture for receiving an auxiliary electrical connection
47 Wire terminal fastener
48 Mounting aperture
50 Cutaway to illustrate the electrical conductor elements
52 Cross sectional designator
54 Cross sectional designator
56 Cross sectional designator
58 Cross sectional designator
60 A generic wireless doorbell circuit board
62 Battery
64 Wireless doorbell circuit board antenna (inactive)
66 Wireless doorbell circuit board antenna (active)
68 Charge of negative polarity electricity
70 Charge of positive polarity electricity
74 Electrical transference from central axial conductor to conductor spring
76 Negative polarity electrical flow initiated by transference
78 Inactive wireless doorbell receiver (typical)
79 Inactive conventional hard-wired doorbell receiver (typical)
80 Activated wireless doorbell receiver (typical)
82 Activated hard-wired doorbell receiver (typical)
84 Hard-wire connection to axial conductor
86 Hard-wire connection to conductor spring lug
88 Hard-wire connection from conventional doorbell to conventional hard-wired receiver (typical)
90 Conduit fastener aperture
92 Conventional doorbell electrical terminal (typical)
94 Housing mounting aperture (typical)
96 Scratch/pawing/claw shield

DETAILED DESCRIPTION OF THE INVENTION

FIG. 1 An introductory perspective view illustrating one manner in which an assembled omnidirectional signaling device of the modular hard-wire type (2) can be connected in a series and hard-wired to a conventional hard-wired doorbell (3) via a conduit for shielding hard-wire connections between signaling devices (6) when, as depicted in this figure, the units are mounted to a door jamb (4) adjacent to a typically closed entry/exit door (5) at the instant when each device is being independently activated by an externally applied omnidirectional swiping force (1) being manually applied to the pawing target (20) of each assembled device (2) by the arcing dominant exampled left-sided forepaw of a small sized pet (8) and contrastingly by the arcing dominant exampled left-sided forepaw of a very large sized pet (7) whose differentiated physical actions ultimately cause the internal interconnected hard-wire electrical connections (88) stemming from the conventional doorbell (3), and leading to the interconnected receiver (82), to sound an alert.

Figure 2:
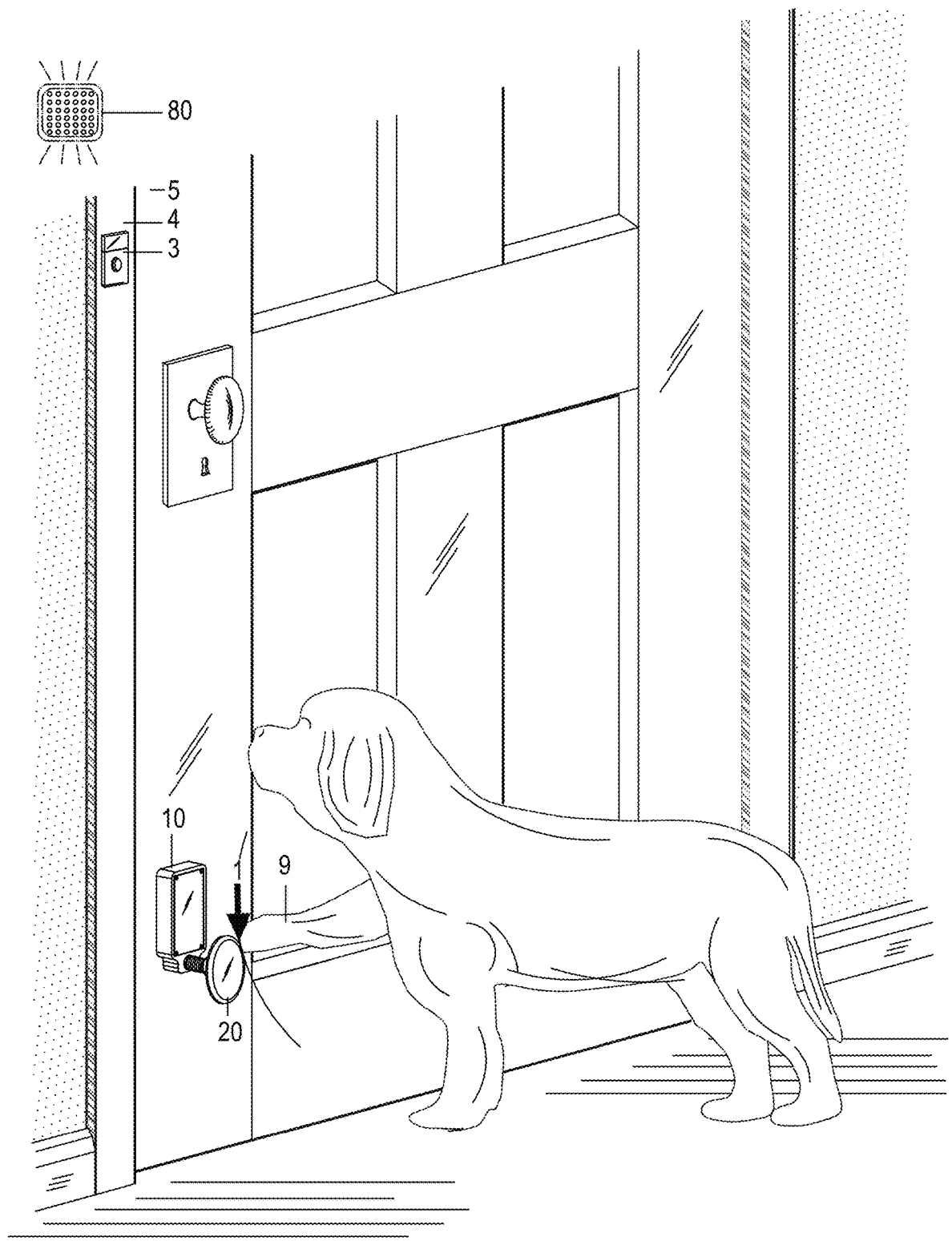
FIG. 2A perspective view depicting the present omnidirectional switch device as it might appear in a wireless form when affixed to a door to illustrate the instant when the moment-producing electrical conductor omnidirectional signal sending deflection switch mechanism of the present device is being swipe activated from a random direction by the naturally arcing forepaw of a medium sized pet.

FIG. 2 An introductory perspective view illustrating one manner in which an assembled omnidirectional signaling device of the self-contained wireless type (10), being mounted directly to a closed entry/exit door (5), is activated by an externally applied omnidirectional swiping force (1) being manually applied to the pawing target (20) of the assembled wireless device (10) by an arcing dominant exampled right-sided forepaw of a medium sized pet (9) whose actions result in the wireless doorbell receiver (80) to sound an alert.

Figure 3:
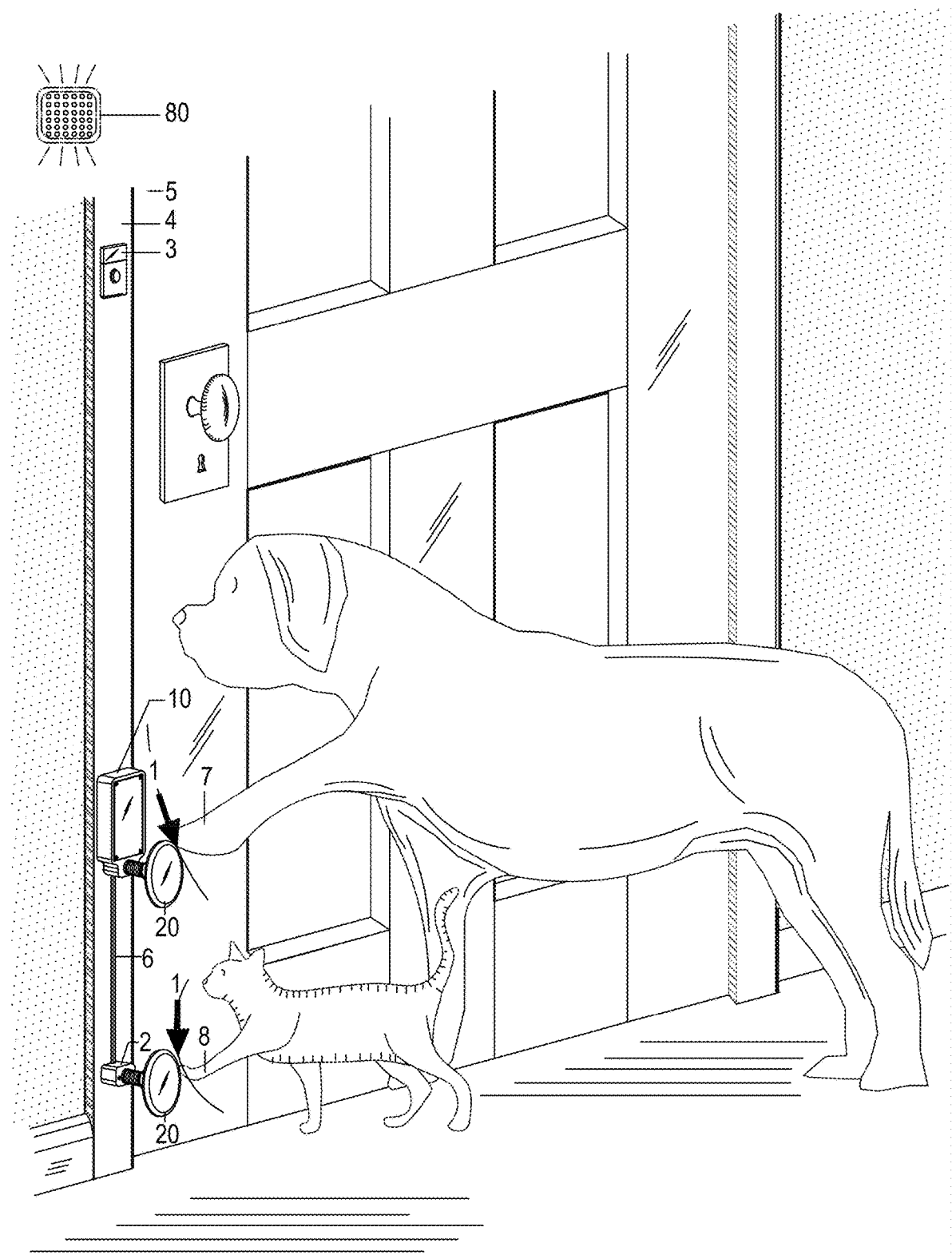
FIG. 3 A contrasting perspective view depicting a modular form of the present omnidirectional switch device interconnected via hard-wire to a wireless form of the present omnidirectional device when affixed to a door jamb to illustrate the moment when each device is being independently swipe activated from two distinctly different random directions to accommodate the natural arcing forepaw actions common to both small and large size pets alike, each of whom is possessed of vastly different heights and forceful capabilities, but who are each enabled to easily activate the moment-producing electrical conductor signal sending omnidirectional deflection switch mechanism of either form of the present device with equally consistent success.

FIG. 3 An introductory perspective view illustrating one manner in which an assembled omnidirectional signaling device of the modular hard-wire type (2) can be connected to an assembled omnidirectional signaling device of the self-contained wireless type (10) via a conduit (6) shielding the hard-wire connections interconnecting the signaling devices (2) (10) when, as depicted in this figure, the omnidirectional signaling devices are mounted to a door jamb (4) in a location adjacent to a typically closed entry/exit door (5) at the instant when each device is being independently activated by an externally applied omnidirectional swiping force (1) that is being manually applied to the pawing target (20) of each respective assembled omnidirectional signaling device (2) (10) by the arcing dominant exampled left-sided forepaw of a small sized pet (8) and contrastingly by the arcing dominant exampled left-sided forepaw of a very large sized pet (7) whose differentiated actions each cause the wireless doorbell receiver (80) to sound an alert.

Figure 4:
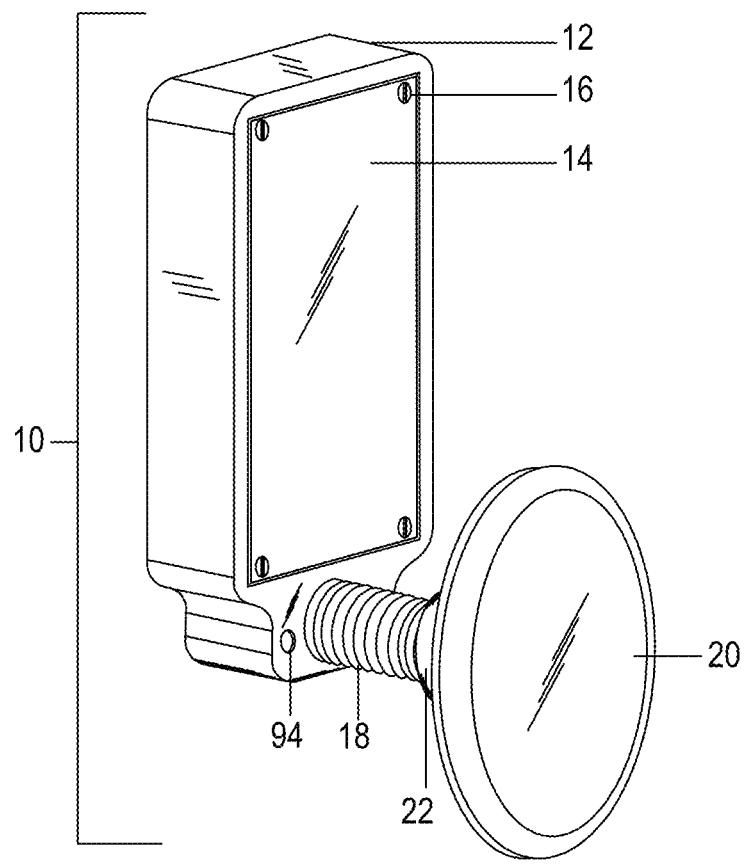
FIG. 4 A perspective view of the present omnidirectional switch device in its assembled wireless form.

FIG. 4 A perspective view depicting a typically assembled omnidirectional signaling device of the self-contained wireless type (10) to highlight the circuit board housing (12) into which the electrical conductor spring (18), equipped with a pawing target (20) attached to its cantilevered end, has been inserted.

Figure 5:
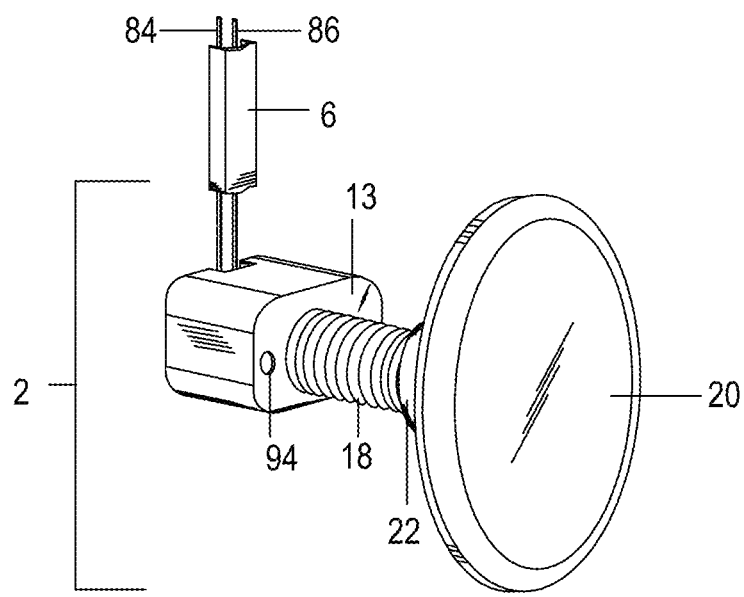
FIG. 5 A perspective view of the present omnidirectional switch device in its assembled hard-wired modular form.

FIG. 5 A frontal perspective view depicting an assembled omnidirectional signaling device of the modular hard-wire type (2) to highlight the typical hard-wire connections (84) (86) stemming from the rear of the modular housing (13) into which the electrical conductor spring (18), equipped with a pawing target (20) attached to its cantilevered end, has been inserted.

FIG. 6 A front view of an assembled omnidirectional signaling device of the self-contained wireless type (10) highlighting in phantom view, the internal concentric and spatial relationships which exist between the attachment spool (22) of the pawing target (20), the electrical conductor spring (18), the electrical conductor spring alignment and retention recess (32), the central axial electrical conductor (30) and the insulator/alignment spool (28), relative to the circuit board housing (12).

FIG. 7 A side view of an omnidirectional signaling device of the self-contained wireless type (10) relative to FIG. 6 to highlight the moment-producing spatial relationships which exist between the cantilevered electrical conductor spring (18), the pawing target (20), the pawing target attachment spool (22), and the circuit board housing (12).

FIG. 8 A rear view of an assembled omnidirectional signaling device of the self-contained wireless type (10) relative to FIG. 6 to highlight the terminal end of the central axial electrical conductor (30) and the terminal end of the electrical conductor spring contact lug (34) which respectfully pass through the electrical conductor strip (36), and the switch activated electrical conductor strip (38), which are subsequently fastened to the circuit board housing (12).

FIG. 9 A top view of an assembled omnidirectional signaling device of the self-contained wireless type (10) relative to FIG. 6 to highlight the moment-producing spatial relationships which exist between the cantilevered electrical conductor spring (18), the pawing target (20), the pawing target attachment spool (22), and the circuit board housing (12).

FIG. 10 A bottom view of an assembled omnidirectional signaling device of the self-contained wireless type (10) relative to FIG. 6 to highlight the moment-producing spatial relationships which exist between the cantilevered electrical conductor spring (18), the pawing target (20), the pawing target attachment spool (22) as well as highlighting the terminal ends of the central axial electrical conductor (30) and the conductor spring contact lug (34) which respectfully pass thru the electrical conductor strip (36), and the switch activated electrical conductor strip (38), which are subsequently fastened to the circuit board housing (12).

Figure 11:
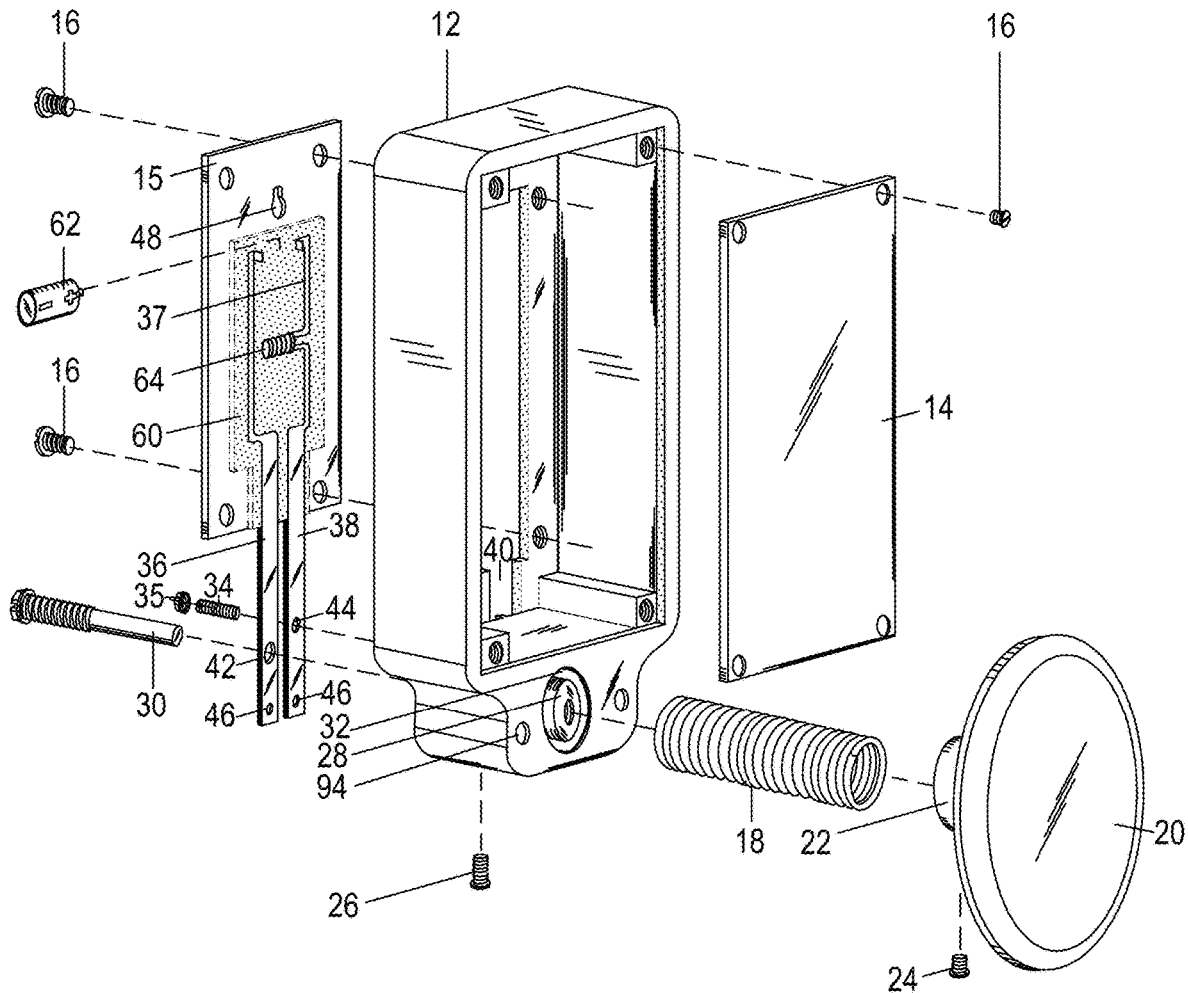
FIG. 11 An exploded view of the present omnidirectional switch device in its wireless form.

FIG. 11 An exploded perspective view of an omnidirectional signaling device of the self-contained wireless type (10) to illustrate the manner in which the electrical conductor strip (36), and the switch activated electrical conductor strip (38) of the wireless doorbell circuit board (60) mounted to the inside face of rear maintenance cover (15), are aligned with the electrical isolation channel (40) of the circuit board housing (12) to subsequently receive the central axial electrical conductor (30), which passes through the aperture (42) of the electrical conductor strip (36), and then centrally through the electrical insulator/alignment spool (28), while the conductor spring contact lug (34), subsequent to passing through the aperture (44) of the switch activated electrical conductor strip (38), is screwed into the circuit board housing (12) until it makes contact with the electrical conductor spring (18) which is inserted into the electrical conductor spring alignment and retention recess (32) situated on the front of the circuit board housing (12) where the cantilevered conductor spring (18) is to be subsequently retained by the retention fastener (26).

Figure 12:
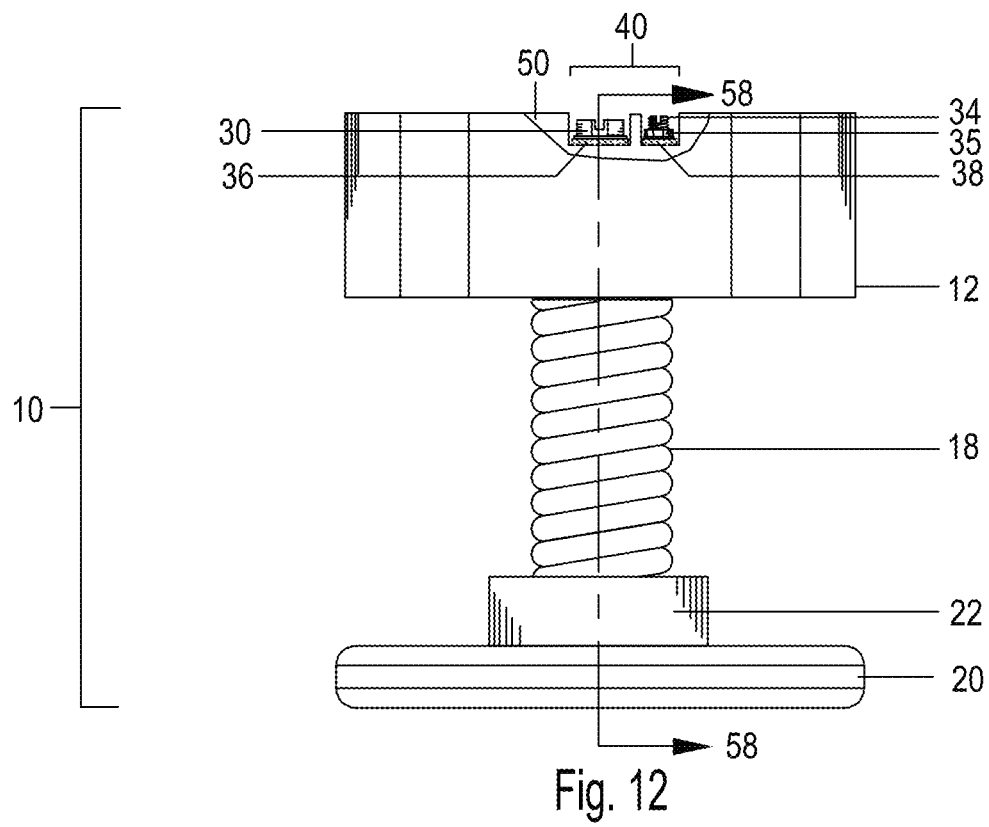
FIG. 12 An enlarged top view of the present omnidirectional switch device in its assembled wireless form relative to FIG. 9 but with a cutaway to illustrate the electrical contact terminals located at the bottom rear of the housing.

FIG. 12 A top view of an assembled omnidirectional signaling device of the self-contained wireless type (10) to highlight the moment-producing spatial relationships which exist between the moment producing cantilevered electrical conductor spring (18), the pawing target (20), the pawing target attachment spool (22), and the circuit board housing (12) while also highlighting, in a cutaway view (50), the terminal ends of the central axial electrical conductor (30) and the conductor spring contact lug (34) situated in the electrical conductor isolation channel (40).

Figure 13:
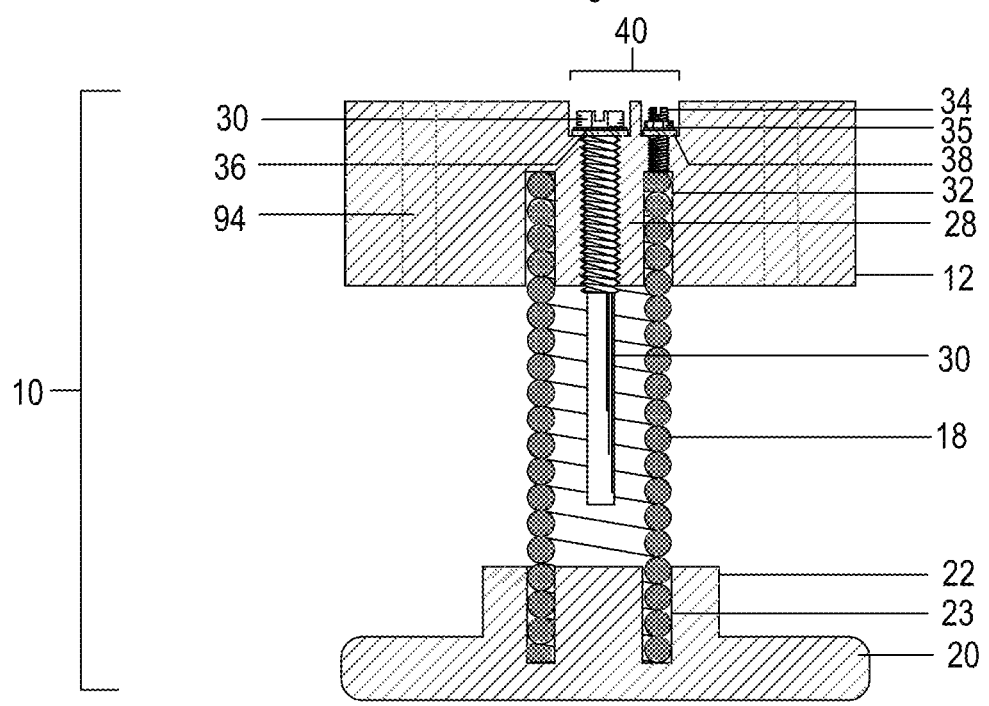
FIG. 13 A sectional top view of the present omnidirectional switch device in its assembled wireless form relative to FIG. 12 to highlight the axial and spatial relationships which exist between the outer flexible cantilevered electrical conductor and the inner cantilevered electrical conductor of the deflection switch mechanism.

FIG. 13 A top sectional view depicting the primary components of the switch mechanism common to both the modular hard-wire form of the present omnidirectional signaling device (2) relative to FIG. 5 and as illustrated here in the form of the present omnidirectional signaling device of the self-contained wireless type (10) relative to the sectional designator (58) of FIG. 12 to further illustrate the spatial relationships which exist between the floating cantilevered end of the electrical conductor spring (18) when inserted into the pawing target retention recess (23) of the pawing target spool (22) of the pawing target (20), and the fixed cantilevered end of the electrical conductor spring (18) when being retained in the electrical conductor spring alignment and retention recess (32) of the circuit board housing (12) and isolated from the central axial electrical conductor

(30) by the electrical insulator/alignment spool (28) through which the cantilevered central axial electrical conductor (30) passes, and further illustrating the manner in which the conductor spring contact lug (34), threaded into the circuit board housing (12), comes into contact with the moment producing cantilevered electrical conductor spring (18) which establishes a path of electrical continuity to the switch activated electrical conductor strip (38) via the terminal cinching nut (35), and the manner in which the isolated central axial electrical conductor (30), subsequent to passing through the electrical conductor strip (36) and threaded into the electrical insulator/alignment spool (28) of the circuit board housing (12), is axially cantilevered within the interior of the cantilevered electrical conductor spring (18) to define the spatial relationships relative to the primary components of the common switch mechanism relative to the wireless housing (10) and the modular housing (2) of FIG. 5.

FIG. 14A front face view depicting a generic wireless doorbell circuit board (60) attached to the inside face of the mounting/maintenance cover (15) of the present omnidirectional signaling device of the self-contained wireless type (10) to illustrate a typical flow of negative polarity electricity (68) and an opposing flow of positive polarity electricity (70) stemming from a battery (62) when the statically energized circuit board (60) is in a open circuit state as the result of the switch activated electrical conductor strip (38) being inactive which electrical conditions renders both the antenna (64) of the wireless doorbell circuit board, and the associated wireless doorbell receiver (78), to be inactive.

FIG. 15A sectional side view of the present omnidirectional signaling device of the self-contained wireless type (10) relative to section (52) of FIG. 7 to illustrate, and in accord with the open circuit diagrammatic as shown in FIG. 14, the spatial relationship of the central axial electrical conductor (30) of the switch mechanism, being isolated from the electrical conductor spring (18) by the electrical insulator/alignment spool (28), statically energized with a negative charge of electricity (68) stemming from the battery (62) via the electrical conductor strip (36).

FIG. 16A sectional front view relative to the cross sectional designator (54) of FIG. 15 to illustrate the statically energized central axial electrical conductor (30) passing through the electrical insulator/alignment spool (28) and concentrically aligned and isolated within the interior of the electrical conductor spring (18) when the switch mechanism is in an open circuit state.

FIG. 17A front face view depicting a generic wireless doorbell circuit board (60) attached to the inside face of the mounting/maintenance cover (15) of the present omnidirectional signaling device of the self-contained wireless type (10) to illustrate the negative flow of electricity (68) and the opposing positive flow of electricity (70) stemming from a battery (62) when the energized circuit board (60) is rendered to a closed circuit state as the result of the switch activated electrical conductor strip (38) being energized which electrical conditions causes the wireless doorbell circuit board antenna (66), and subsequently the wireless doorbell receiver (80), to be electronically activated.

FIG. 18A sectional side view of the present omnidirectional signaling device of the self-contained wireless type (10) relative to FIG. 15 to illustrate, in accord with the closed circuit electrical diagrammatic of FIG. 17, the manner in which an external swiping force (1), acting on the pawing target (20) from any direction, causes the moment producing cantilevered end of the electrical conductor spring (18) to flex and to come into contact (74) with the energized central axial electrical conductor (30) thereby allowing a charge of negative polarity electricity (76) to travel sequentially into and through the electrical conductor spring (18), the conductor spring contact lug (34), and ultimately into and through the electrical conductor strip (38) which actions close the electrical circuit resulting in the activation of the wireless doorbell circuit board antenna (66) which subsequently activates the wireless doorbell receiver (80).

FIG. 19A sectional front view relative to the cross sectional designator (56) of FIG. 18 to illustrate, in accord with the closed circuit electrical diagrammatic of FIG. 17 and FIG. 18, the manner in which an externally applied omnidirectional swiping force (1), being randomly applied to the pawing target (20), causes the moment producing end of the cantilevered electrical conductor spring (18) to flex and to come into contact with the energized and formerly electrically isolated central axial electrical conductor (30) which actions cause the electrical conductor spring (18) to become energized by a transference of electricity (74) which actions close the electrical circuit resulting in the activation of the wireless doorbell circuit board antenna (66) which subsequently activates the wireless doorbell receiver (80) as depicted in FIG. 17.

FIG. 20A magnified sectional side view illustrating the common primary components of the switching mechanism illustrated here in the form of the present omnidirectional signaling device of the self-contained wireless type (10) relative to FIG. 15, and in accord with the open circuit diagrammatic of the generic wireless doorbell circuit board (60) in FIG. 14, more specifically illustrating the central axial electrical conductor (30) passing through the electrical insulator/alignment spool (28) and energized with a charge of negative polarity electricity (68) via the statically energized electrical conductor strip (36) while being isolated from the electrical conductor spring (18) which itself is being retained within the alignment and retention recess (28) of the circuit board housing (12) by the electrical conductor spring retention fastener (26) to ultimately establish a firm electrical connection between the conductor spring contact lug (34), and the electrical conductor spring (18).

FIG. 21A magnified sectional front view relative to the cross sectional designator (54) of FIG. 20 and in accord with the open circuit diagrammatic of FIG. 14 and FIG. 20, to illustrate the spatial relationships of the statically energized central axial electrical conductor (30) projecting from the insulator/alignment spool (28) and concentrically aligned within the interior confines of the electrical conductor spring (18) when the switch mechanism is in an open circuit state.

FIG. 22A magnified sectional side view illustrating the common primary components of the switching mechanism illustrated here in the form of the present omnidirectional signaling device of the self-contained wireless type (10) relative to FIG. 18 and in accord with the closed circuit electrical diagrammatic of the generic wireless doorbell circuit board (60) as shown in FIG. 17, more specifically illustrating the manner in which the central axial electrical conductor (30), passing through the electrical insulator/alignment spool (28), and energized with a charge of negative polarity electricity (68) via the energized electrical conductor strip (36), interacts with the cantilevered electrical conductor spring (18) as the result of an external swiping force (1) acting on the pawing target (20) which causes the cantilevered electrical conductor spring (18) to flex and to come into contact (74) with the energized central axial electrical conductor (30) thereby causing a charge of negative polarity electricity (76) to travel sequentially into and through the electrical conductor spring (18), the conductor spring contact lug (34), and ultimately into and through the electrical conductor strip (38) of FIG. 17 which ultimately closes the electrical circuit which actions activate the wireless doorbell circuit board antenna (66) whose signal in turn activates the wireless doorbell receiver (80) in accord and relative to the electrical circuitry diagrammatic of FIG. 17.

FIG. 23 A sectional front view relative to the cross sectional designator (56) of FIG. 22 to illustrate, relative to and in accord with the closed circuit diagrammatic of FIG. 17, FIG. 18, and FIG. 22 the manner in which an externally applied omnidirectional swiping force (1) being applied to the pawing target (20) causes the cantilevered electrical conductor spring (18) to flex and come into contact with the energized central axial electrical conductor (30) which actions result in the cantilevered electrical conductor spring (18) becoming energized by the transference of electricity (74) to close the electrical circuit.

FIG. 24 A sectional front view to illustrate, with respect to the closed circuit diagrammatic of FIG. 17 and FIG. 18, and in the spirit of FIG. 22, the manner in which any randomly applied arcing swiping force (1) imposed upon the pawing target (20) from any external direction causes the cantilevered electrical conductor spring (18) to flex and to come into contact with the energized central axial electrical conductor (30) which actions result in the cantilevered electrical conductor spring (18) becoming energized by the transference of electricity (74) to close the electrical circuit.

Figure 25:
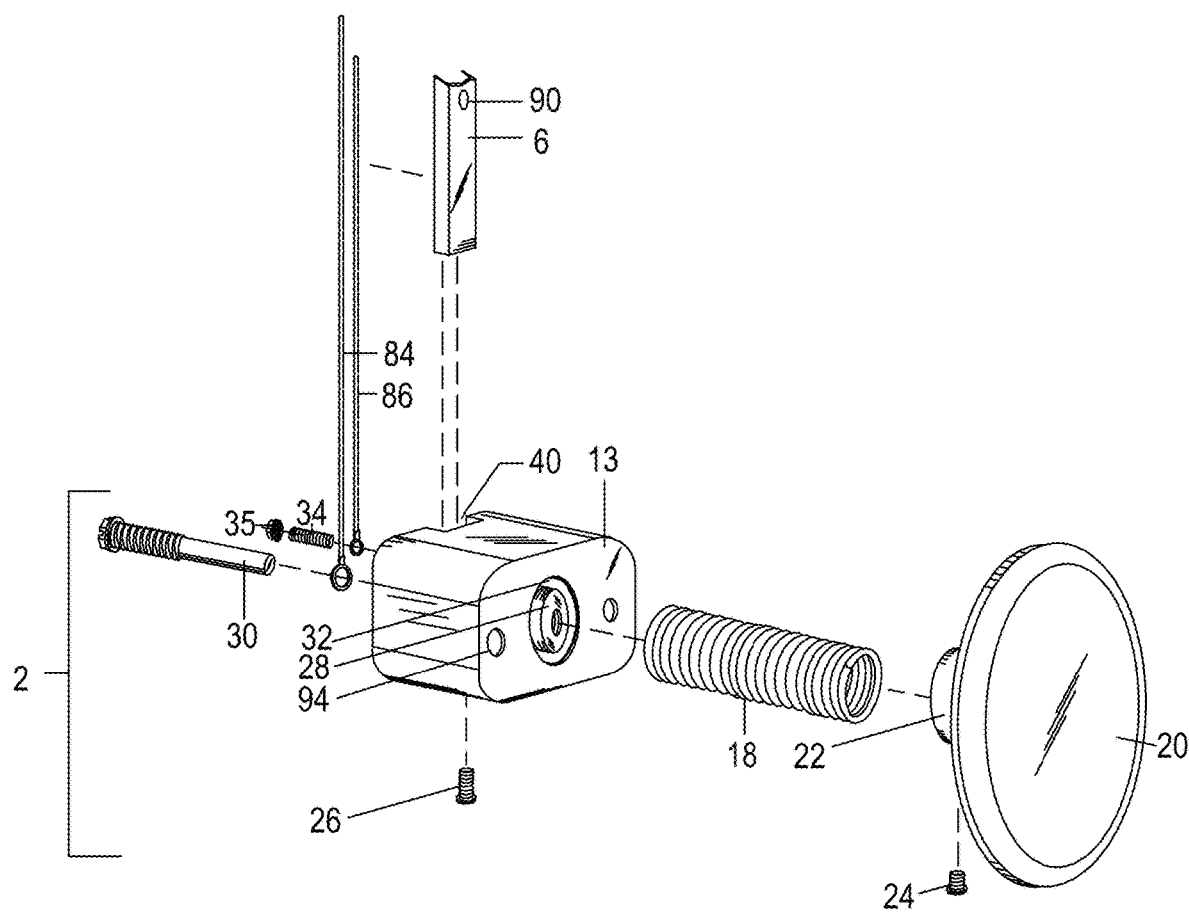
FIG. 25 An exploded view of the present omnidirectional switch device in its modular hard-wire form.

FIG. 25 An exploded perspective view of the present omnidirectional signaling device of the modular hard-wired type (2) to illustrate the manner in which the central axial electrical conductor (30) passes through the corresponding hard-wire (84) terminal and then centrally through the electrical insulator/alignment spool (28) of the modular housing (13), and the manner in which the conductor spring contact lug (34), after passing through the corresponding hard-wire (86) terminal, is subsequently screwed into the rear of the modular housing (13) until it makes permanent contact with the electrical conductor spring (18) which itself, subsequent to being inserted into the electrical conductor spring alignment and retention recess (32) situated on the front of the modular housing (13), is thereafter retained by the retention fastener (26), and to further illustrate the manner in which the hard-wires (84) (86) are to be aligned and situated in the electrical isolation channel (40) located at the rear of the modular housing (13) where the hard-wires (84) (86) are thereafter shielded between signaling devices by the conduit (6).

Figure 26:
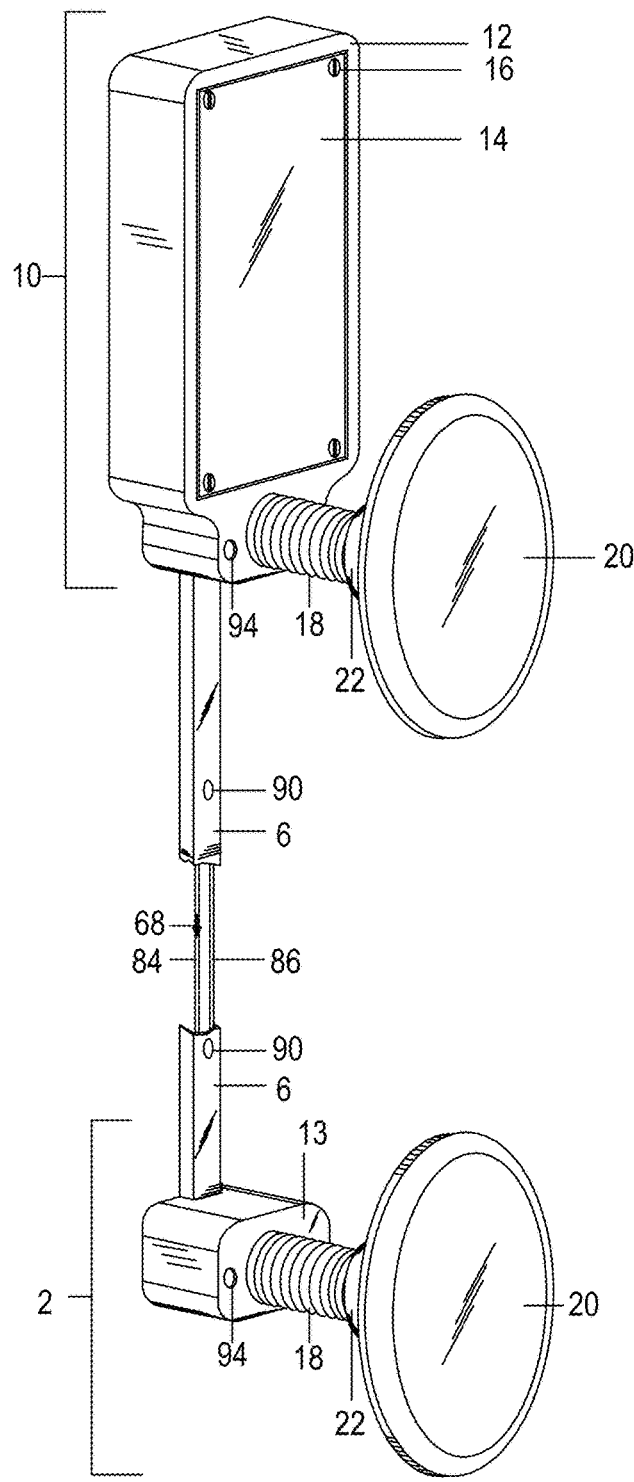
FIG. 26 A perspective view depicting a modular hard-wire form of the present omnidirectional switch device interconnected to a wireless form of the present omnidirectional switch device which itself provides the electric power for the system in this particular configuration.

FIG. 26 A perspective view of an assembled omnidirectional signaling device of the modular hard-wired type (2) interconnected via hard-wire (84) (86) to the corresponding electrical circuitry of an assembled omnidirectional signaling device of the wireless type (10) when both devices are in an open-circuit at-the-ready state in accord and relative to the electrical diagrammatic conditions as depicted in FIG. 14 and FIG. 15.

Figure 27:
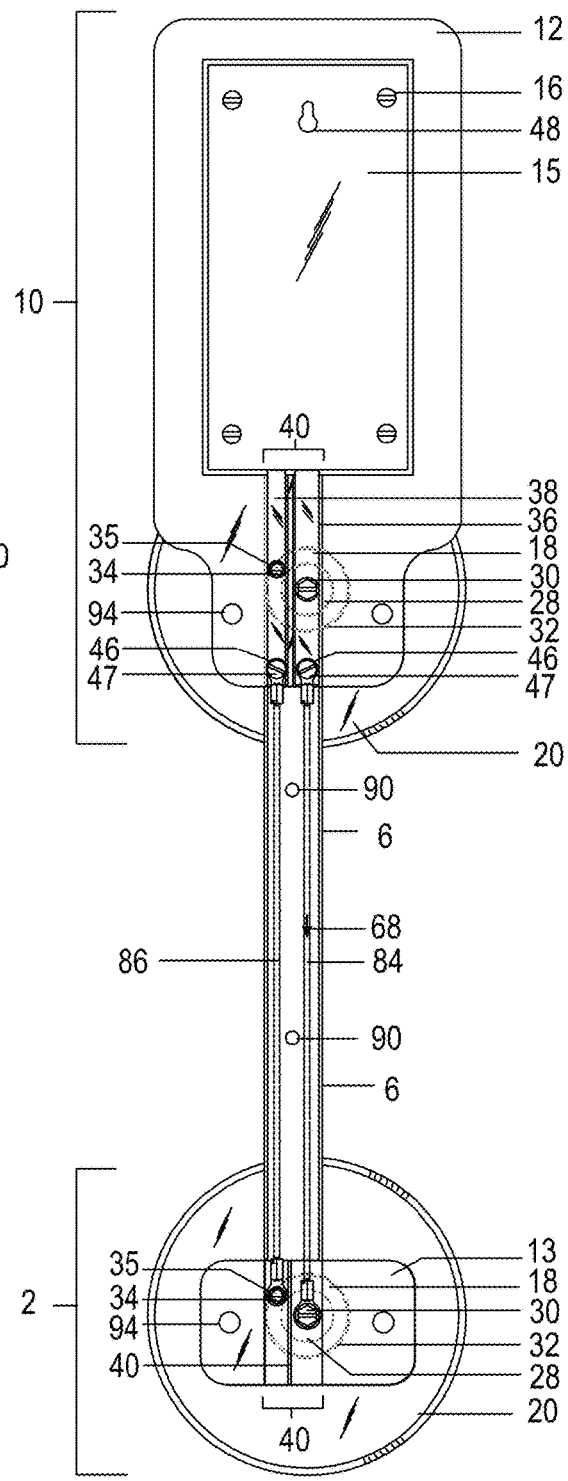
FIG. 27 A rear view of the present omnidirectional switch device relative to FIG. 26 depicting a modular hard-wire form of the present omnidirectional doorbell device interconnected to a wireless form of the present omnidirectional doorbell device to highlight the manner in which the typical hard-wire connections are made from one to the other.

FIG. 27 A rear view of the assembled omnidirectional signaling devices relative to FIG. 26 to illustrate the manner in which the omnidirectional signaling device of the wireless type (10) is typically interconnected to the corresponding electrical circuitry of the modular hard-wire type of omnidirectional signaling device (2) via the associated and respective wire terminal fasteners (47) of the corresponding hard-wire (84) (86) connections.

Figure 28:
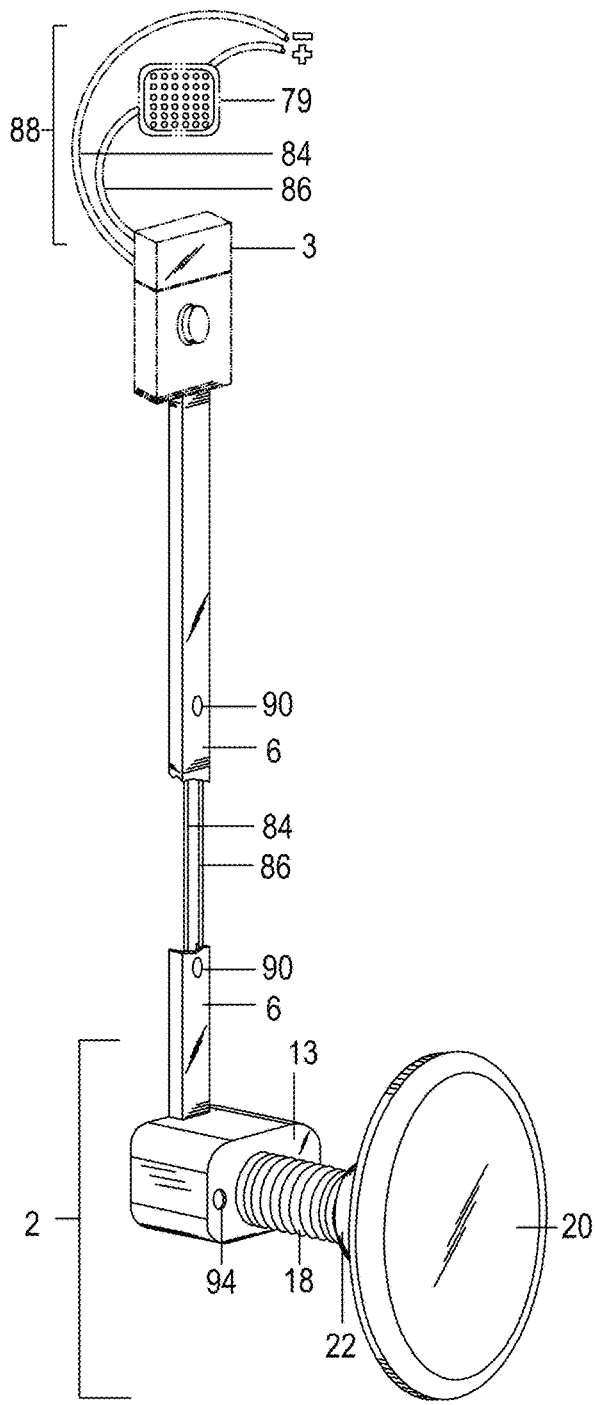
FIG. 28 A perspective view depicting one electrical manner in which a modular hard-wire form of the present omnidirectional doorbell device is interconnected with a conventional hard-wired doorbell of the human activated linear push-button type.

FIG. 28 A perspective view of an assembled omnidirectional signaling device of the modular hard-wire type (2) interconnected via hard-wire (84) (86) to the electrical circuitry (88) of a conventional linear type of hard-wired doorbell (3) when each doorbell device (2) (3) is in an open-circuit state since neither switch mechanism is being subjected to a manually applied external force.

Figure 29:
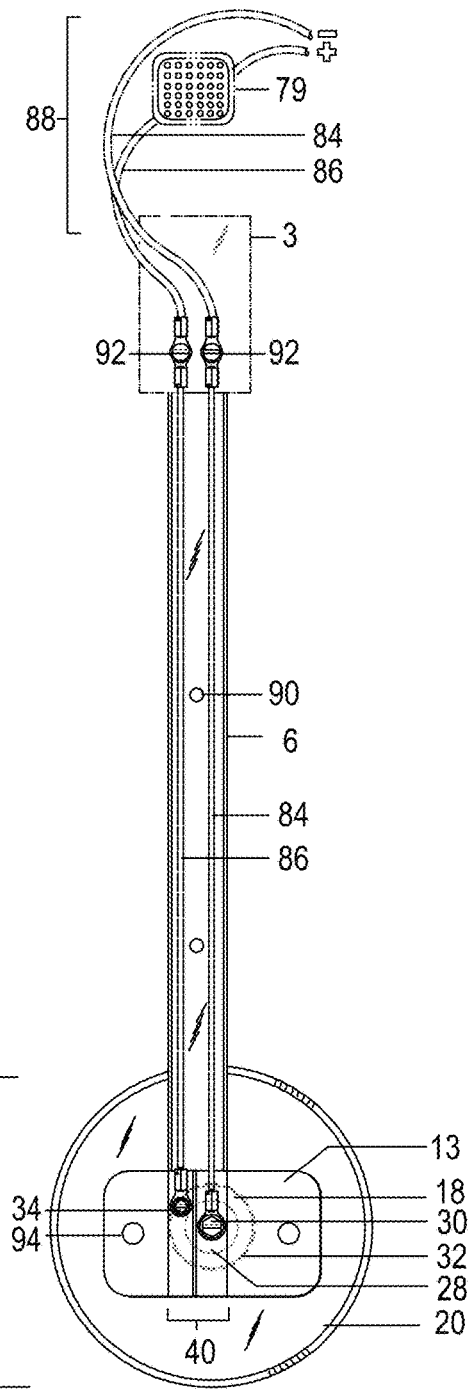
FIG. 29 A rear view depicting a modular hard-wire form of the present omnidirectional doorbell device interconnected to a conventional hard-wired doorbell of the human activated linear push-button type relative to FIG. 28 to highlight one manner in which a typical hard-wire connection can be made.

FIG. 29 A rear view relative to FIG. 28 to illustrate the manner in which an omnidirectional signaling device of the modular hard-wire type (2) is typically interconnected to the corresponding electrical circuitry (88) of a conventional linear-type of hard-wired doorbell (3).

Figure 30:
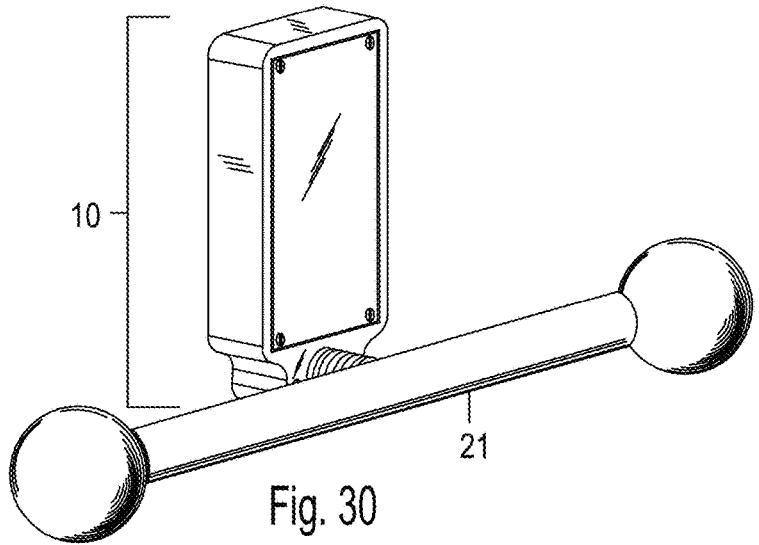
FIG. 30 A perspective view of a wireless form of the present omnidirectional switch device outfitted with an elongated pawing target to further provide a pet with an enhanced target zone and an enhanced moment producing means.
Figure 31:
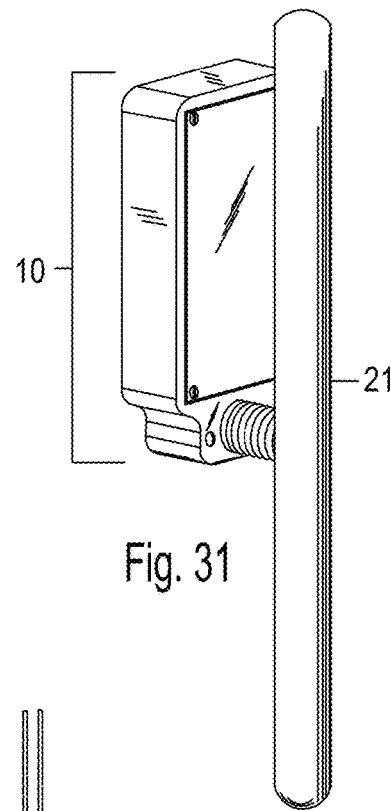
FIG. 31 A perspective view of a wireless form of the present omnidirectional switch device outfitted with an elongated pawing target to further provide a pet with an enhanced target zone and an enhanced moment producing means.

FIG. 30 and FIG. 31 Perspective views of the present omnidirectional signaling device of the wireless type (10) to illustrate variations of a pawing target in an elongated form (21) that broadens the swiping zone of an arcing forepaw, and/or to enhance the moment-producing effect relative to the cantilever aspect of the design, and/or to better meet the conditions on which an omnidirectional signaling device is to be mounted or subjected to, such as along the bottom of a door as depicted in FIG. 30, or along a door jamb as depicted in FIG. 31.

Figure 32:
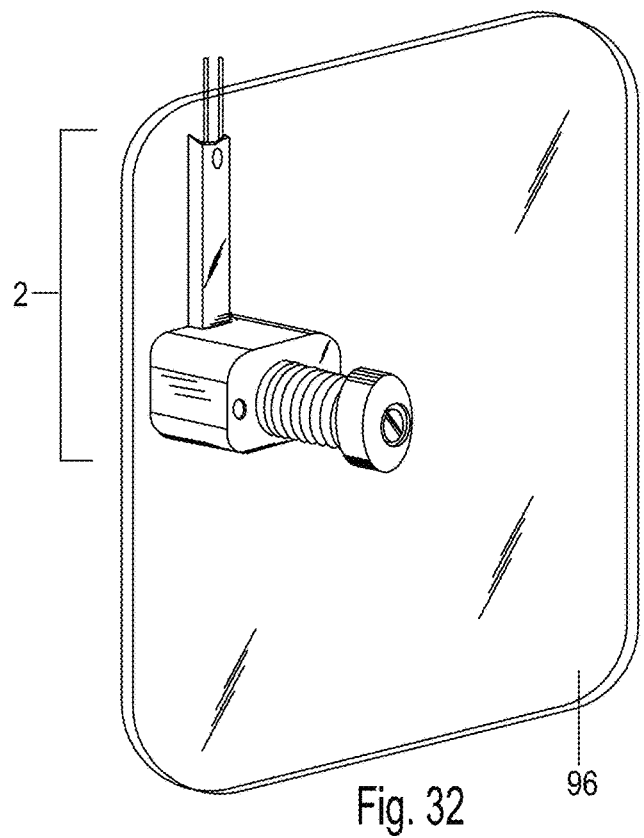
FIG. 32 A perspective view of a hard-wire form of the present omnidirectional switch device outfitted with an example of an enhanced moment producing target zone while also providing a caretaker with a means for shielding the adjacent areas to which the assembly is attached from becoming scratched by impatient or errant forepaws.

FIG. 32 A perspective view of the present omnidirectional signaling device of the modular hard-wire type (2) outfitted with a scratch shield (96) affixed to a pawing target (20) that broadens a swiping zone of an arcing forepaw, enhances the moment-producing effect relative to the cantilever aspect of the design, while simultaneously preventing damage to an adjacent surface as the result of the expected long term use by the repeated pawing actions of clawing forepaws being impatiently applied.

Figure 33:
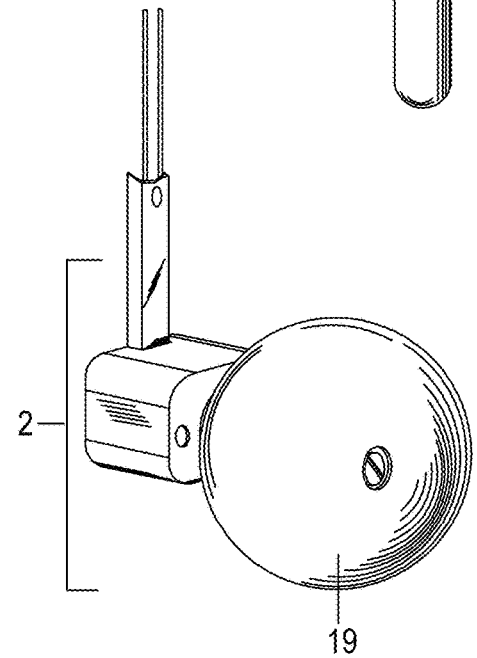
FIG. 33 A perspective view of a hard-wire form of the present omnidirectional switch device outfitted with an example of a spherical pawing target that provides a pet with an enhanced target zone while shielding the primary switch components from inclement weather conditions.

FIG. 33 A perspective view of the present omnidirectional signaling device of the modular hard-wire type (2) to illustrate a variation of a pawing target in a spherical form (19) which may be optionally mounted to an omnidirectional device to broaden a forepaw swiping zone, or to enhance the moment-producing effect relative to the cantilever aspect of the design, and/or to better shield the cantilevered components from inclement weather conditions.

CONCLUSIONS, RAMIFICATIONS AND SCOPE

The reader will see I have provided an improved doorbell switch for pets that:
a. is omnidirectional in nature.
b. is most humane.
c. is convenient for all participants.
d. enables a domestic pet, of any size or height, or weight class to send an electronic alert to its caretaker in a most natural manner.
e. intrinsically amplifies a minor swiping force being applied to its moment producing cantilevered end.
f. is long term.
g. is of universal application.
h. is consistently dependable.
i. is most easily taught.
j. is practical.
k. can be interconnected to compensate for accumulated snow depths and/or to accommodate pets of various sizes and physical attributes.
l. can be easily adjusted and/or modified as the pet grows.
m. is non-vibratory.
n. is durable.
o. is of a simple and compact design.
p. is easily retrofitted to an existing household doorbell system.
q. is beneficial for blind caretakers.
r. can be independently installed in either a modular hard-wire or a self-contained wireless form.

s. is easily accessorized or customized to enhance the pawing target zone.

t. can be illuminated.

u. can accommodate a video doorbell system.

I claim:

1. A swipe-activated self-canceling omnidirectional contact switch mechanism comprised of a mountable housing fitted with two independent electrical conductors which interconnect with a variety of electrified ancillary alerting systems to signal a domestic animals immediate desire for attention;

(a) wherein said swipe-activated self-canceling omnidirectional contact switch mechanism is manually activated from any direction by the instinctive pawing actions common to both felines and canines alike, regardless of their age, size, weight, or their dominant pawing side;

(b) wherein one said electrical conductor is situated within the spatial confines of an outer electrical conductor which is semi-rigid, flexible, and hollow;

(c) wherein said electrical conductors share a common central axis;

(d) wherein said mountable housing of said swipe-activated self-canceling omnidirectional contact switch mechanism is configured to receive, retain, and to keep each respective end of each said electrical conductor isolated from one another;

(e) wherein said mountable housing of said swipe-activated self-canceling omnidirectional contact switch mechanism is configured to keep the body of said outer semi-rigid, flexible, and hollow electrical conductor from contacting the body of said inner electrical conductor when no external pawing force is being applied to said outer semi-rigid, flexible, and hollow electrical conductor;

(f) wherein each said isolated electrical conductor is independently configured with an electrical contact terminal to which an ancillary electrical connection corresponding to the electronic signal activation requirements of said electrified ancillary alerting system, to which said swipe-activated self-canceling omnidirectional contact switch mechanism is connected, can be affixed;

(g) wherein each said isolated electrical conductor, subsequent to being connected to said electrified ancillary alerting system via said isolated electrical contact terminals respectively corresponding to the electronic signal activation requirements of said electrified ancillary alerting system, are electrified;

(h) wherein said electrified outer semi-rigid, flexible, and hollow electrical conductor, while remaining isolated from said electrified inner electrical conductor, presents an open electrical circuit condition;

(i) wherein said electrified outer semi-rigid, flexible, and hollow electrical conductor, when subjected to an externally applied swiping force acting upon said electrified outer semi-rigid, flexible, and hollow electrical conductor from any external direction, deflects;

(j) wherein said forced deflection of said electrified outer semi-rigid, flexible, and hollow electrical conductor causes the interior of said electrified outer semi-rigid, flexible, and hollow electrical conductor to come into contact with the exterior of said electrified inner electrical conductor to close said open electrical circuit;

(k) wherein said closed electrical circuit thereby activates the electronic circuitry of said electrified ancillary alerting system to which said electrical conductors of said swipe-activated self-canceling omnidirectional contact switch mechanism are connected;

(l) wherein said closed electrical circuit causes the receiver of said electrified ancillary alerting system to announce a pets immediate desire for attention via an electronically generated audible and/or visual signal particular to said electrified ancillary alerting system;

(m) wherein said electronically generated audible and/or visual signal, particular to said electrified ancillary alerting system, terminates upon the abatement of said externally applied swiping force acting on said electrified outer semi-rigid, flexible, and hollow electrical conductor;

(n) wherein said interior of said outer semi-rigid, flexible, and hollow electrical conductor, upon the abatement of said externally applied swiping force acting upon said electrified outer semi-rigid, flexible, and hollow electrical conductor, naturally retracts from the exterior surface of said electrified inner electrical conductor to reinitialize an open circuit condition of said swipe-activated self-canceling omnidirectional contact switch mechanism.

2. The device of claim 1 wherein said mountable housing is illuminated.

3. The device of claim 1 wherein said mountable housing illuminates on a closed circuit condition.

4. The device of claim 1 wherein said outer semi-rigid, flexible, and hollow electrical conductor is configured with an attachable means to enhance the target zone for a pawing animal.

5. The device of claim 4 wherein the size, weight, and/or shape of said attachable means to enhance the target zone for a pawing animal is configured to alleviate the externally applied swiping force necessary to achieve a closed circuit condition, especially for those pets that are naturally endowed with gentler pawing characteristics, such as kittens, puppies, or the aged.

* * * * *